US005609410A

United States Patent [19]
Rives

[11] Patent Number: 5,609,410
[45] Date of Patent: Mar. 11, 1997

[54] LIGHTING OR SIGNALLING DEVICE FOR A MOTOR VEHICLE, THE DEVIE INCLUDING A MINIATURE BULB

[75] Inventor: Claude Rives, Evreux, France

[73] Assignee: Valeo Vision, Bobigny, France

[21] Appl. No.: 44,182

[22] Filed: Apr. 7, 1993

[30] Foreign Application Priority Data

Apr. 8, 1992 [FR] France .................................. 92 04292

[51] Int. Cl.$^6$ ................................................. H01R 33/00
[52] U.S. Cl. ........................... 362/226; 362/80; 362/255; 313/318.02; 313/318.1
[58] Field of Search ............................. 313/318, 318.02, 313/318.09, 318.1; 362/61, 74, 80, 80.1, 255, 226, 389, 396

[56] References Cited

U.S. PATENT DOCUMENTS

| | | | |
|---|---|---|---|
| 3,109,598 | 11/1963 | Morgan | 362/226 |
| 3,125,299 | 3/1964 | Woofter et al. | 313/318 |
| 3,265,923 | 8/1966 | Preziosi et al. | 313/318.02 |
| 4,500,948 | 2/1985 | Blaisdell et al. | 362/226 |
| 4,812,955 | 3/1989 | Beswick et al. | 362/61 |
| 4,845,601 | 7/1989 | Podbury et al. | 362/226 |
| 4,851,970 | 7/1988 | Bronder | 362/74 |
| 4,886,994 | 12/1989 | Ragge, Jr. | 313/318 |
| 4,979,081 | 12/1990 | Leach et al. | 362/226 |

FOREIGN PATENT DOCUMENTS

| | | | |
|---|---|---|---|
| 984886 | 3/1976 | Canada | 313/318 |
| 849619 | 8/1939 | France | 362/80 |
| 2212073 | 7/1974 | France . | |
| 2143557 | 3/1973 | Germany . | |
| 1301688 | 1/1973 | United Kingdom | 362/80 |

Primary Examiner—Ira S. Lazarus
Assistant Examiner—Alan B. Cariaso
Attorney, Agent, or Firm—McCormick, Paulding & Huber

[57] ABSTRACT

A support element for a bulb in particular a miniature bulb in a motor vehicle, the support element being of the type including at least one elastically deformable branch for holding and making electrical connection with an end terminal of the bulb and fastening means for fixing the support element to a base. According to the invention said fastening means comprises at least one fixing tab including at least one projecting toe, said fixing tab being suitable for being inserted essentially perpendicularly to a plane of said base in the same direction as is used for installing a bulb on the base, the tab being forced into at least one housing provided in the base in such a manner that the, or each, projecting toe engages in a wall of said housing. The invention is applicable to making lighting devices of glove boxes or rear number plates of motor vehicles.

9 Claims, 2 Drawing Sheets

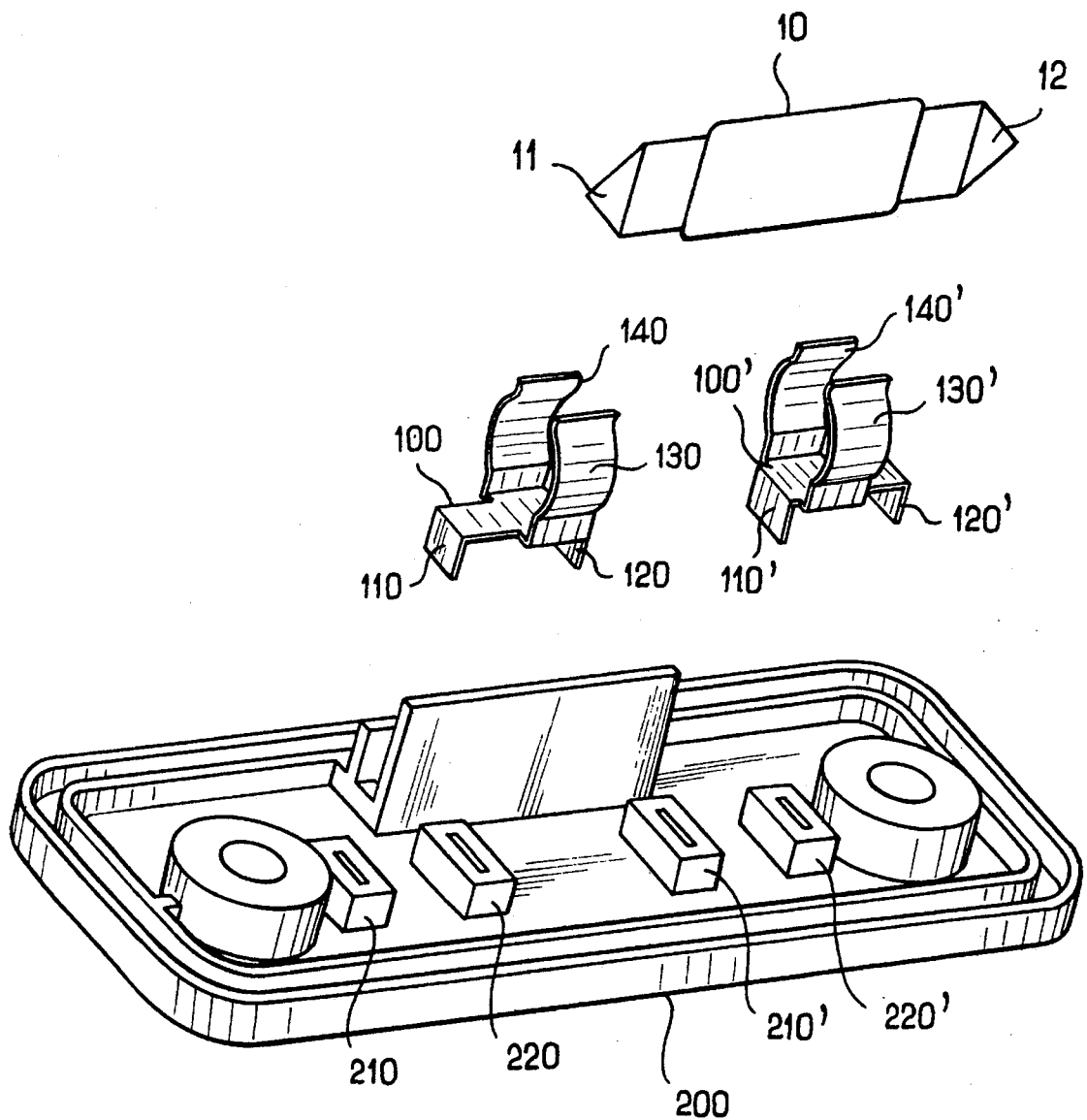
FIG_1

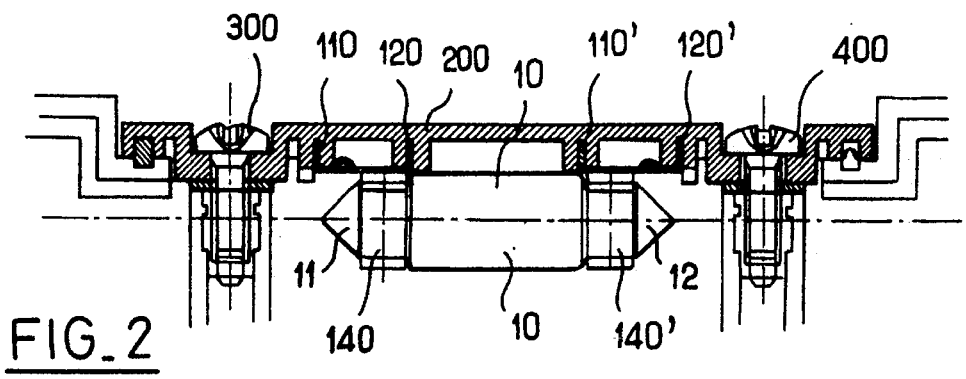
FIG_2
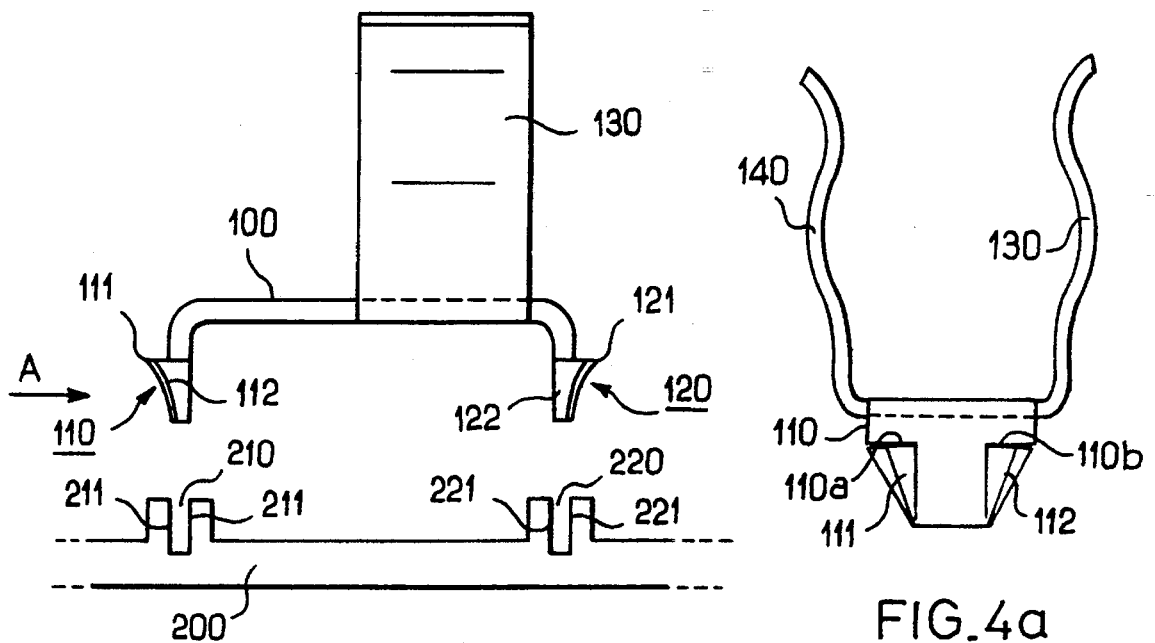
FIG_3
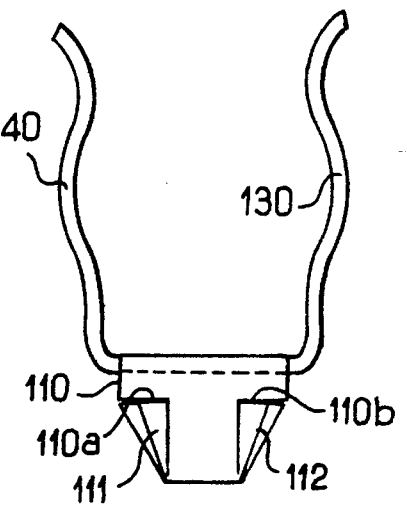
FIG_4a
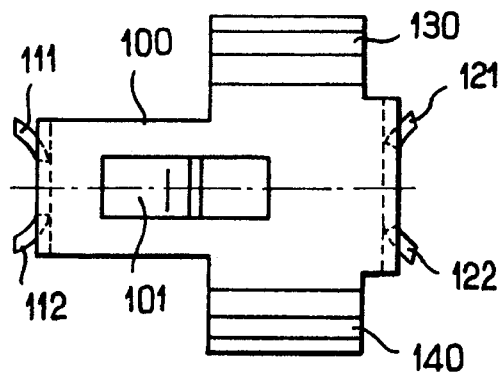
FIG_5
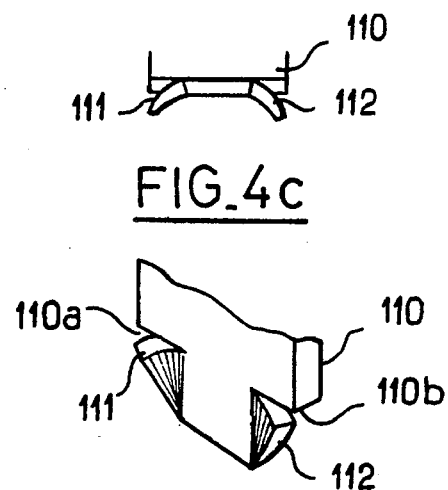
FIG_4c
FIG_4b

LIGHTING OR SIGNALLING DEVICE FOR A MOTOR VEHICLE, THE DEVIE INCLUDING A MINIATURE BULB

FIELD OF THE INVENTION

The present invention relates in general to lighting or signalling devices, in particular for motor vehicles, and of the type comprising a bulb such as a miniature bulb, and more particularly the invention relates to a novel support element for the bulb, the support element being of the type comprising at least one electrical connection and holding means for the bulb and novel means for fixing to a base.

BACKGROUND OF THE INVENTION

At present, in the state of the art, a miniature bulb lighting device for a motor vehicle is known that is particularly used for lighting a glove box, a rear number plate, or as a roof light, a door light, or a courtesy light, the device including a cylindrical miniature or "lillyput" bulb and a bulb support which is fixed to a base which is in turn mounted on the vehicle. The support has two essentially flat and rectangular lamp-supporting elements carrying metal branches for making electrical connections with and for holding the bulb. These bulb support elements are engaged essentially parallel to the plane of the base in fixing grooves provided on the base. To secure said elements in said grooves, the portions of the base that form the walls of said grooves are heated locally so as to cause said walls to melt and partially overlie the support elements. Thus, when the lighting device is installed, the miniature bulb is suspended from the base, being held by said support elements which are themselves held in place by means of solidified melt tongues that extend essentially perpendicular to the direction of the force exerted on said support elements, in particular when removing the bulb.

That lighting device suffers from several drawbacks.

Assembling such a device is complex because of the operation in which the support elements are secured to the base, which operation is not easy to perform. It is necessary to heat the base at the walls of each of the grooves in order to melt the walls onto the support elements, with such heating being capable of causing other elements of the device to be subjected to plastic deformation, e.g. the support elements themselves. In addition, when the base is constituted by a transparent material so as to constitute a window through which light leaves said device, the support-supporting portions after melting, and the supports themselves, form shadow zones of large extent that tend to reduce the lighting efficiency of such a device.

In order to mitigate the last-mentioned drawback, the automatic response of the person skilled in the art is to reduce the extent of the support elements and/or of the melted securing tongues on the base, without completely re-thinking the fastening means used that consist in holding said support elements in place by means of tongues that extend perpendicularly to the force exerted by the bulb on said supports, given that, a priori, the strongest fastening is provided by means extending perpendicularly to the force exerted.

SUMMARY OF THE INVENTION

In contrast to the above-specified prejudice, the invention proposes a novel a support element for a bulb in particular a miniature bulb in a motor vehicle, the support element being of the type including at least one elastically deformable branch for holding and making electrical connection with an end terminal of the bulb and fastening means for fixing the support element to a base, wherein said fastening means comprises at least one fixing tab including at least one projecting toe, said fixing tab being suitable for being inserted essentially perpendicularly to the plane of said base, the tab being forced into at least one housing provided in the base in such a manner that the, or each, projecting toe engages in a wall of said housing.

Thus, it is advantageous to observe that according to the present invention, the fixing tab of the support element is secured to the base in a direction that is essentially perpendicular to the plane of the base. Although this fixing direction is essentially parallel to the direction of the force exerted by the bulb on the support suspended from the base, the fixing tab of the invention turns out to constitute fastening means of adequate strength.

In addition, the fixing tab of the invention has the advantage of extending at a small angle relative to the light radiation that may pass through the base, thereby making it possible considerably to reduce the shadow zones in the associated lighting device.

In one embodiment of the support element of the invention, the fastening means includes two fixing tabs mounted at two respective ends of the said support and suitable for being forced into two respective housings provided in the base.

In addition, the, or each, fixing tab is essentially flat in shape, and the, or each, projecting toe is made by bending the material of said fixing tab beneath a notch that extends inwards from the side edge of said tab. As a result, the cross-section of each toe tapers towards the free end of the associated fixing tab.

The present invention also provides a lighting or signalling device, in particular for a motor vehicle, the device being of the type comprising a bulb such as a miniature bulb, a base, and support means for supporting the bulb on the base, said support means comprising two support elements of the invention.

BRIEF DESCRIPTION OF THE DRAWINGS

The following description of non-limiting embodiments is made with reference to the accompanying drawings and shows clearly how the invention can be implemented and what it consists in.

FIG. 1 is an overall perspective diagram of a lighting device of the invention.

FIG. 2 is a side view of the FIG. 1 device once installed.

FIG. 3 is a diagrammatic side view of a support element of the invention.

FIG. 4a is a view of the support element of FIG. 3, as seen along arrow A.

FIG. 4b is a perspective view showing a fragment of FIG. 4a.

FIG. 4c is a view of the portion shown in FIG. 4b, seen end-on.

FIG. 5 is a plan view of the support element of the invention.

MORE DETAILED DESCRIPTION

With reference initially to FIGS. 1 and 2, there can be seen a lighting device of the invention. The device comprises a miniature bulb 10, a base 200, and support means 100, 100' for supporting the bulb 10 on the base. Each support element 100, 100' comprises two resiliently deformable branches 130 & 140 and 130' & 140' for holding and making electrical connection with a respective end terminal 11 or 12 of the bulb 10. As can be seen more clearly in FIG. 5, each support element 100 and 100' has a window 101 in its central portion, suitable for passing an electrical connection wire (not shown) for powering the bulb. In addition, the support elements 100 and 100' include fastening means for fixing them to the base. These fastening means are constituted by two pairs of fixing tabs 110 & 120 and 110' & 120', provided at respective opposite ends of said support elements and suitable for being force-fitted essentially perpendicular to the plane of the base into respective housings 210, 220, 210', and 220' provided in the base.

FIG. 3 shows a detail of a support element 100 of the invention that forms a portion of the lighting device of FIG. 1. As can be seen in this figure, each of the two fastening tabs 110 and 120 of said element 100 includes two projecting toes 111 & 112 or 121 & 122 close to the opposite side edges of said tab. More particularly, as can be seen in FIGS. 4a, 4b, and 4c, each fixing tab 110 and 120 is essentially flat, and each projecting toe is implemented by twisting the metal of the fastening tab that extends beneath a notch 110a or 110b that extends inwards from the side edge of the fastening tab. As can be seen more clearly in FIG. 4c, each toe is of a section that tapers towards a free end of the associated fastening tab.

When the fastening tabs 110 and 120 are inserted essentially perpendicularly to the plane of the base, being forced into respective housings 210 and 220 provided in the base, the projecting toes engage in the walls 211, 221 of the associated housing.

It should be specified that the projecting toes are made of a metal that is capable of deforming elastically while the toes are being inserted into said housings, and that is capable of plastically deforming the substance from which the base is made so as to enable them to be securely engaged in the walls 211 and 221 of said housings.

When the lighting device of the invention is installed in a vehicle by means of screws 300 and 400, e.g. for the purpose of illuminating the rear number plate of the vehicle, as shown in FIG. 2, the bulb 10 is held in place on the support elements 100 and 100' that are fixed to the base. When force is exerted on the bulb in order to remove it, the fixing tabs 110, 120, 110', and 120' then exert a holding force due to the projecting toes that are securely retained in the base, which force opposes the force tending to extract the elements from the support. This holding force turns out to be strong enough to enable the bulb to be removed under normal conditions.

In addition, it is advantageous to observe that when the base 200 is made of transparent or translucent material to constitute a window through which the light from the lighting or signalling device escapes, the direction in which the fastening tabs 110 and 120 are oriented is such as to ensure that they constitute shadow zones that are small and that cause practically no light to be lost.

I claim:

1. A support element for a bulb, in particular a miniature bulb, the support element being of a type including at least one elastically deformable branch for holding and making electrical connection with an end terminal of the bulb and fastening means for fixing the support element to a base, said fastening means comprising at least one fixing tab including at least one projecting toe, said element support being fixed to said base by a translatory movement in a direction essentially perpendicularly to a plane of said base such that during said translatory movement said fixing tab is forced into at least one housing provided in the base, said housing being parallel to said direction for installing the support element on the base, in such a manner that the, or each project toe firmly grips into a wall of said housing.

2. A support element according to claim 1, wherein the fastening means includes two fixing tabs mounted at two respective ends of the support element and suitable for being forced into two respective housings provided in the base.

3. A support element according to claim 1, wherein each fixing tab is essentially flat and includes two projecting toes in the vicinity of two opposite side edges of said tab.

4. A support element according to claim 1, wherein the, or each, fixing tab is essentially flat in shape, and in that the, or each, projecting toe is made by bending the material of said fixing tab beneath a notch that extends inwards from a side edge of said tab.

5. A support element according to claim 1, wherein the cross-section of each toe tapers towards a free end of the associated fixing tab.

6. A lighting or signaling device, the device comprising a bulb, in particular a miniature bulb, a base, and support means for supporting the bulb on the base, the support means comprising two support elements, each support element including at least one elastically deformable branch for holding and making electrical connection with an end terminal of the bulb and fastening means for fixing the support element to a base, said fastening means comprising at least one fixing tab including at least one projecting toe, said fixing tab for being inserted in a direction essentially perpendicularly to a plane of said base, said direction of insertion of said fixing tab being the same direction for installing the bulb on the base, the tab being forced into at least one housing provided in the base in such a manner that each projecting toe firmly grips into a wall of said housing.

7. A device according to claim 6, wherein the base is transparent or translucent, and constitutes an outlet window for the light from the lighting or signalling device.

8. A support element for a bulb m particular a miniature bulb, the support element including at least one elastically deformable branch for holding and making electrical connection with an end terminal of the bulb and fastening means for fixing the support element to a base, wherein said fastening means comprises at least one fixing tab essentially flat in shape and including at least one projecting toe that is made by bending a material of said fixing tab beneath a notch that extends inwards from a side edge of said tab, said fixing tab for being inserted essentially perpendicularly to a plane of said base, said direction of insertion of said fixing tab being the same direction for installing the bulb on the base, the tab being forced into at least one housing provided in the base in such a manner that the at least one projecting toe securely grips into a wall of said housing.

9. A support element for a bulb, in particular a miniature bulb, the support element being of a type including at least one elastically deformable branch for holding and making electrical connection with an end terminal of the bulb and fastening means for fixing the support element to a base, said fastening means comprising at least one fixing tab including at least one projecting toe, the, or each, projecting toe being of a section that tapers towards a free end of said fastening tab, said element support being fixed to said base by a translatory movement in a direction essentially perpendicularly to a plane of said base such that during said translatory movement said fixing tab is forced into at least one housing provided in the base, said housing being parallel to said direction for installing a support element on the base, in such a manner that the, or each, projecting toe firmly grips into a wall of said housing.

* * * * *

UNITED STATES PATENT AND TRADEMARK OFFICE
CERTIFICATE OF CORRECTION

PATENT NO. : 5,609,410
DATED : March 11, 1997
INVENTOR(S) : Claude Rives

It is certified that error appears in the above-indentified patent and that said Letters Patent is hereby corrected as shown below:

Title page;
Item [54]

Line 2, delete "DEVIE" and substitute --DEVICE--.

Claim 1

Column 4, line 3, delete "project" and substitute --projecting--.

Claim 8

Column 4, line 37, delete "m" and substitute --in--.

Signed and Sealed this

Twenty-third Day of September, 1997

Attest:

BRUCE LEHMAN

Attesting Officer      Commissioner of Patents and Trademarks